United States Patent
Crosby

(10) Patent No.: US 12,351,784 B2
(45) Date of Patent: Jul. 8, 2025

(54) CRYOGENIC HOP PROCESSING METHOD

(71) Applicant: Crosby Hop Farm, LLC, Woodburn, OR (US)

(72) Inventor: Blake Crosby, Lake Oswego, OR (US)

(73) Assignee: Crosby Hop Farm, LLC, Woodburn, OR (US)

( * ) Notice: Subject to any disclaimer, the term of this patent is extended or adjusted under 35 U.S.C. 154(b) by 0 days.

(21) Appl. No.: 18/310,431

(22) Filed: May 1, 2023

(65) Prior Publication Data

US 2023/0348825 A1 Nov. 2, 2023

Related U.S. Application Data

(60) Provisional application No. 63/384,921, filed on Nov. 23, 2022, provisional application No. 63/336,879, filed on Apr. 29, 2022.

(51) Int. Cl.
*C12C 3/06* (2006.01)

(52) U.S. Cl.
CPC ...................... *C12C 3/06* (2013.01)

(58) Field of Classification Search
CPC ........................................ C12C 3/06
See application file for complete search history.

(56) References Cited

U.S. PATENT DOCUMENTS

| | | | |
|---|---|---|---|
| 4,053,653 A | 10/1977 | Miyata et al. | |
| 10,864,525 B1 * | 12/2020 | Barone | B03B 5/38 |
| 11,214,765 B2 | 1/2022 | Vanevenhoven et al. | |
| 2019/0194585 A1 * | 6/2019 | Vanevenhoven | C12C 3/06 |
| 2019/0329294 A1 | 10/2019 | Knapp | |

(Continued)

FOREIGN PATENT DOCUMENTS

| | | |
|---|---|---|
| EP | 1100865 B1 | 11/2003 |
| WO | 00/06691 A1 | 2/2000 |
| WO | WO2019055587 A1 | 3/2019 |

OTHER PUBLICATIONS https://www.altitudebrew.com/blogs/news/t-45-versus-t-90-hop-pellets Altitude Brewing and Supply (T-45 versus T-90 Hop Pellets) Apr. 25, 2017 (Year: 2017).*

(Continued)

*Primary Examiner* — Vera Stulii
(74) *Attorney, Agent, or Firm* — Kolitch Romano Dascenzo Gates LLC

(57) ABSTRACT

A method for cryogenically processing hops includes: simultaneously cryogenically cooling a plurality of hop cones and fracturing each hop cone of the plurality of hop cones into one or more respective fractured hop pieces using a cryogenic mixer; without an intervening fracturing step, separating the fractured hop pieces such that the fractured hop pieces are divided into lupulin powder and vegetative matter; and compressing the lupulin powder into pellets. A system for cryogenically processing hops includes: a cryogenic mixer including: one or more liquid nitrogen injection nozzles configured to inject liquid nitrogen into the mixer; and an agitator comprising a plurality of paddles coupled to a central shaft; wherein the cryogenic mixer is configured to both freeze the hops and fracture the hops into one or more pieces; and a sifter configured to separate the fractured hops into lupulin powder and vegetative matter.

15 Claims, 3 Drawing Sheets

(56) References Cited

U.S. PATENT DOCUMENTS

2021/0069725 A1  3/2021  Barone et al.

OTHER PUBLICATIONS https://hopsteiner.ru/wp-content/uploads/2018/04/02_09_type_45.pdf Hopsteiner (Pellet Type 45 ((Concentrated Pellets)). 2017 (Year: 2017).*

International Search Report and Written Opinion of the International Searching Authority from the Korean Intellectual Property Office, in PCT/US2023/020616 dated Sep. 4, 2023, which is an international application corresponding to this U.S. application.

* cited by examiner

CRYOGENIC HOP PROCESSING METHOD

CROSS-REFERENCES

The following applications and materials are incorporated herein, in their entireties, for all purposes: U.S. Provisional Patent Application Ser. No. 63/336,879, filed Apr. 29, 2022; U.S. Provisional Patent Application Ser. No. 63/384,921, filed Nov. 23, 2022.

FIELD

This disclosure relates to systems and methods for processing hops. More specifically, the disclosed embodiments relate to systems and methods for producing pelletized lupulin powder.

INTRODUCTION

Hops and hop byproducts are utilized in the manufacturing processes of many modern beers. While whole hop cones are commonly used, hop cones may also be separated into their component parts to allow for greater control of a beer's characteristics. Each component of a hop cone contributes unique properties to the resulting beer. Hop cones comprise a central strig, or stem, leaflike bracts and bracteoles extending from the strig, and lupulin glands disposed beneath the bracteoles. Lupulin, an oleoresin found within the lupulin glands of the hop cone, contains alpha acids, beta acids, and essential oils which flavor and preserve beer. Accordingly, lupulin is extracted from raw hop cones to produce useful byproducts for the flavoring of beer, such as pelletized lupulin and lupulin powder.

SUMMARY

The present disclosure provides systems, apparatuses, and methods relating to cryogenic hop processing.

In some examples, a method for cryogenically processing hops includes: simultaneously cryogenically cooling a plurality of hop cones and fracturing each hop cone of the plurality of hop cones into one or more respective fractured hop pieces using a cryogenic mixer; without an intervening fracturing step, separating the fractured hop pieces such that the fractured hop pieces are divided into lupulin powder and vegetative matter; and compressing the lupulin powder into pellets.

In some examples, a method for cryogenically processing hops includes: simultaneously cryogenically cooling a plurality of hop cones and fracturing each hop cone of the plurality of hop cones into one or more respective fractured hop pieces using a cryogenic mixer; and separating the fractured hop pieces such that the fractured hop pieces are divided into lupulin powder and vegetative matter; wherein an entirety of a size reduction of the plurality of hop cones is carried out in the cryogenic mixer.

In some examples, a system for cryogenically processing hops includes: a cryogenic mixer including: one or more liquid nitrogen injection nozzles configured to inject liquid nitrogen into the mixer; and an agitator comprising a plurality of paddles coupled to a central shaft; wherein the cryogenic mixer is configured to both freeze the hops and fracture the hops into one or more pieces; and a sifter configured to separate the fractured hops into lupulin powder and vegetative matter.

Features, functions, and advantages may be achieved independently in various embodiments of the present disclosure, or may be combined in yet other embodiments, further details of which can be seen with reference to the following description and drawings.

DETAILED DESCRIPTION

Figure 1:
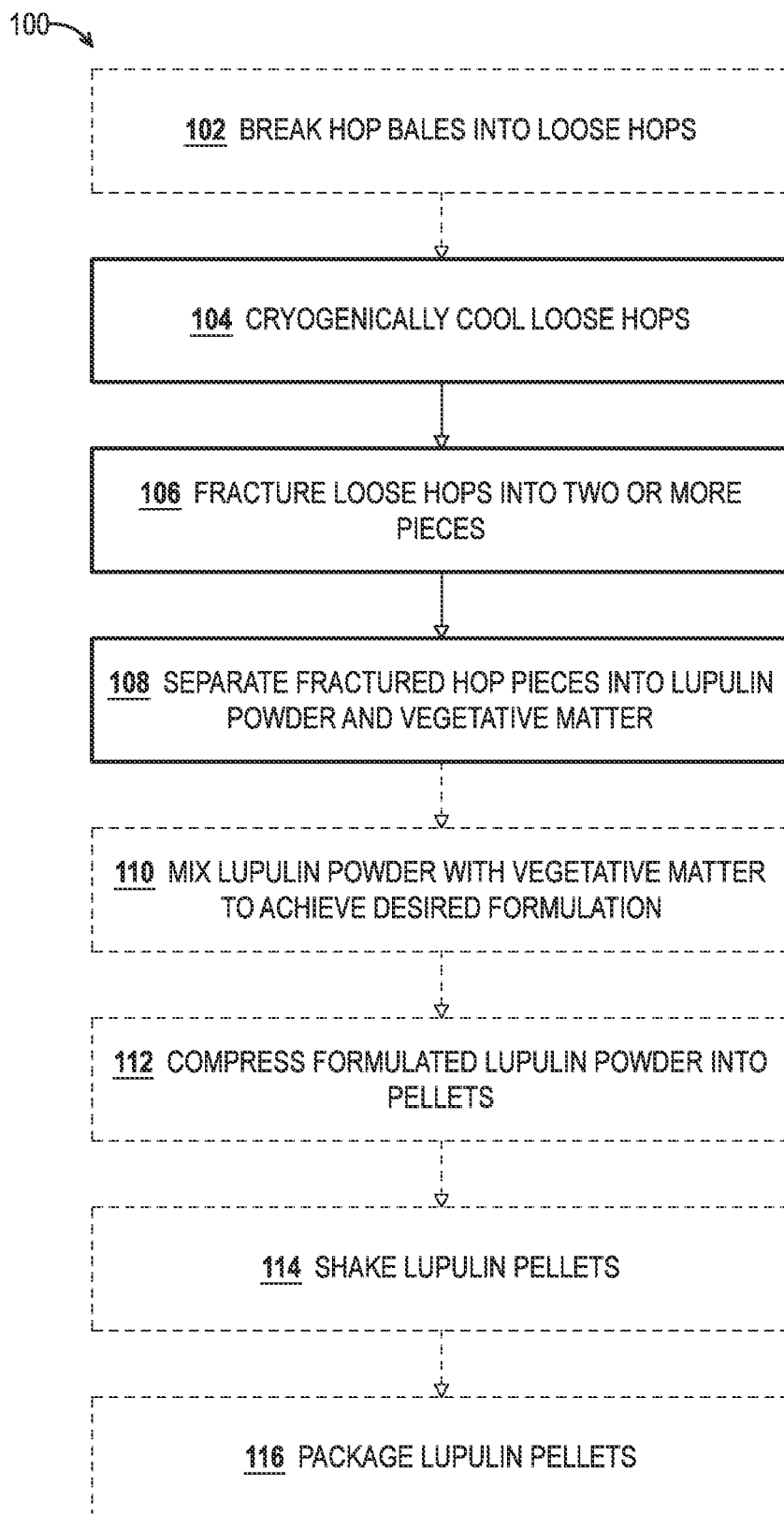
FIG. 1 is a flow chart depicting steps of an illustrative method for cryogenically processing hops according to the present teachings.

Various aspects and examples of a cryogenic hop processing method, as well as related system, are described below and illustrated in the associated drawings. Unless otherwise specified, a cryogenic hop processing method in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

Cryogenic hop processing methods in accordance with the present teachings separate lupulin powder from other components of the hop cone (e.g., bract, vegetative matter). Isolating the lupulin powder from other portions of the hop cone produces a more concentrated product, facilitating reduced shipping and handling when compared with hop products including both lupulin powder and vegetative matter (e.g., whole hops, whole hop pellets such as standard T90 hop pellets, etc.). Separated lupulin powder may be utilized in powder form, or may be subsequently compressed into pellets (i.e., pelletized lupulin powder). Brewing processes that utilize hop products having less vegetative material, such as lupulin powder and/or pelletized lupulin, have improved finished beer yields (increasing profit per batch for the brewer). In some examples, utilizing hop products having less vegetative matter reduces undesirable side reactions such as "hop creep," wherein vegetative matter mixed with the lupulin powder causes refermentation during dry hopping. Cryogenic hop processing methods in accordance with the present teachings provide highly concentrated lupulin powder and/or pelletized lupulin, and may result in these and other benefits.

In general, a cryogenic hop processing method in accordance with the present teachings includes: cooling and/or freezing loose raw hops (AKA hop cones), fracturing the cooled hops into one or more pieces, and separating the fractured hops into lupulin powder and vegetative matter (AKA bract). In some examples, the steps of cooling the hop cones and fracturing the hop cones are performed substantially simultaneously, such that the hops are cooled and fractured in a single step. Accordingly, the hop cones are cooled and/or frozen throughout an entirety of size reduction steps included in cryogenic hop processing methods of the present teachings. In other words, once the hop cones are fractured during the step of fracturing the cooled hops into one or more pieces, the fractured hop pieces are not further processed (e.g., reduced in size, ground, chopped, pulverized, and/or the like) before the step of separating the fractured hops into lupulin powder and vegetative matter.

In some examples, the steps of cooling the hop cones and fracturing the hop cones are performed using a cryogenic mixer configured to inject liquid nitrogen into a mixing chamber containing the hops while also fracturing the hops into one or more pieces. In some examples, the cryogenic mixer comprises an agitator comprising a plurality of paddles coupled to a central shaft.

Processing hops according to the methods of the present disclosure produces greater yields and more highly concentrated lupulin powder than conventional methods. This is true for at least the following reasons. First, lupulin (e.g., lupulin glands, lupulin powder, etc.) comprises hop acids and essential oils, which may undergo chemical changes at high temperatures. Processing the hops at low temperatures preserves the lupulin in powder form, resulting in consistent yields and preventing undesirable changes in chemical composition. As lupulin is an oleoresin, the lupulin may become sticky when warm and adhere to the vegetative matter. In subsequent separating steps, the adhered lupulin may be inadvertently discarded with the vegetative matter, reducing an overall lupulin yield of the hop processing method. Additionally, chemical changes within the lupulin resulting from high temperatures may change properties of the lupulin, negatively affecting the characteristics of a resulting beer.

Second, processing hops according to the methods of the present teachings produces highly concentrated lupulin powder as compared with known methods. As all size reduction of the hops occurs in a single step and while the hops are chilled, the fractured pieces of vegetative matter are significantly larger than the lupulin powder particles. In some examples, an average particle size of the vegetative matter is at least twice as large as an average particle size of the lupulin powder. In some examples, an average particle size of the vegetative matter is three times as large as an average particle size of the lupulin powder. In some examples, an average particle size of the vegetative matter is at least five times as large as an average particle size of the lupulin powder. In some examples, an average particle size of the vegetative matter is at least one order of magnitude greater than an average particle size of the lupulin powder (i,e., ten times as large as an average particle size of the lupulin powder).

Accordingly, during the step of separating the fractured hops into lupulin powder and vegetative matter, a sifter may be used having openings sized between the vegetative matter particle size and the lupulin powder particle size. As the cryogenic hop processing method does not include any additional size reduction steps, such as milling, grinding, pulverization, crushing, and/or the like, the vegetative matter remains in relatively large pieces when compared to the lupulin powder. This facilitates the effective separation of the vegetative matter from the lupulin powder by sifting. In some examples, separating the vegetative matter from the lupulin powder by sifting includes placing the fractured hops in an upper chamber of a sifter. The fractured hops are placed onto a screen having openings, holes, and/or apertures sized between an average particle size of the vegetative matter and an average particle size of the lupulin powder and shaken, vibrated, agitated, and/or the like. As the fractured hops are shaken, the lupulin powder is dislodged from the fractured hops and passes through openings in the screen. The vegetative matter remains in the upper chamber, where it may be transported to compost or for further processing. Because vegetative matter processed according to the methods described herein remains in relatively large pieces and is not pulverized or crushed, the vegetative matter does not pass through the openings in the screen, and is effectively separated from the lupulin powder by sifting. In some examples, the screen has openings, holes, and/or apertures sized between a minimum particle size of the vegetative matter and a maximum particle size of the lupulin powder.

In contrast, conventional methods such as milling pulverize the hop cones, producing particles of vegetative matter that are similar in size (e.g., on a same order of magnitude) as particles of lupulin powder. Accordingly, the pulverized particles of vegetative matter are harder to effectively separate from the lupulin powder by sifting. The lupulin powder of conventional methods is therefore more likely to be mixed with vegetative matter. This results in a lower concentration of lupulin and a lower purity level as compared with the lupulin powder produced by the cryogenic hop processing methods described herein. Cryogenic hop processing methods in accordance with the present teachings therefore produce highly concentrated lupulin powder when compared with conventional methods. Furthermore, as lupulin powder produced using cryogenic hop processing methods in accordance with the present teachings is relatively pure and devoid of vegetative matter, unwanted enzymatic reactions during storage are greatly reduced or avoided. Impure lupulin powder may be susceptible to "hop creep," wherein vegetative matter mixed with the lupulin powder causes refermentation during dry hopping, resulting in undesirable properties in the finished beer.

In some examples, cryogenic hop processing methods in accordance with the present teachings further comprise: mixing the lupulin powder with the vegetative matter to achieve a desired lupulin concentration. In some examples, cryogenic hop processing methods in accordance with the present teachings further comprise: cooling the mixed lupulin powder. In some examples, cryogenic hop processing methods in accordance with the present teachings further comprise: compressing the lupulin powder into pellets.

In general, a cryogenic hop processing system in accordance with the present teachings is configured to carry out the methods described herein, and includes a cryogenic mixer configured to cool and fracture hops and a sifter (e.g., a vibrating sifter) configured to separate fractured hop pieces into lupulin powder and vegetative matter. In some examples, the cryogenic hop processing system comprises further components configured to carry out additional steps of the cryogenic hop processing method. In some examples, the cryogenic hop processing system further comprises a mixing vessel configured to facilitate the control of lupulin powder formulation, e.g., to specific concentrations and percentages of alpha acids. In some examples, the cryogenic hop processing system further comprises a pellet mill including an intake line configured to cool the lupulin powder before pellet production. In some examples, the cryogenic hop processing system further comprises a shaker system configured to recycle excess lupulin powder, e.g., back into the mixing vessel. In some examples, the cryogenic hop processing system further comprises a pneumatic conveyance system configured to transport lupulin powder throughout the hop processing system using negative air pressure and without the use of mechanical augers.

Examples, Components, and Alternatives

The following sections describe selected aspects of illustrative cryogenic hop processing methods, as well as related systems. The examples in these sections are intended for illustration and should not be interpreted as limiting the scope of the present disclosure. Each section may include one or more distinct embodiments or examples, and/or contextual or related information, function, and/or structure.

A. Illustrative Method

This section describes steps of an illustrative method 100 for cryogenically processing hops; see FIG. 1. Aspects of a hop processing system 200, as described below in section B, may be utilized in the method steps of method 100. Where appropriate, reference may be made to components and systems that may be used in carrying out each step. These references are for illustration, and are not intended to limit the possible ways of carrying out any particular step of the method.

FIG. 1 is a flowchart illustrating steps performed in an illustrative method, and may not recite the complete process or all steps of the method. Although various steps of method 100 are described below and depicted in FIG. 1, the steps need not necessarily all be performed, and in some cases may be performed simultaneously or in a different order than the order shown.

Step 102 of method 100 includes optionally breaking raw hop bales into loose raw hops. Hops are generally transported to processing facilities in bales of raw hops, which are compressed, compacted, and/or the like into dense bales. Preparing the raw hops for processing may include separating the compacted hops, such that individual hop cones are loose. In some examples, breaking bales of raw hops into loose raw hops includes aerating and/or agitating the hop bales using a device (e.g., a bale breaker) having one or more agitators, such as rollers, augers, combs, blades, knives, paddles, and/or the like. In some examples, breaking bales of raw hops into loose raw hops includes agitating the hops manually using handheld tools, such as pitchforks, machetes, and/or the like. In some examples, method 100 begins with this step having already been accomplished or made unnecessary.

Step 104 of method 100 includes cooling and/or freezing the loose raw hops (AKA hop cones). Cooling and/or freezing the hop cones prevents lupulin powder contained within the hop cones from undergoing undesirable chemical changes resulting from added heat during processing. Because lupulin powder contains essential oils, added heat may cause the lupulin powder to become sticky, resulting in lower yields as the lupulin powder adheres to processing equipment and/or vegetative matter. In some examples, step 104 includes reducing a temperature of the raw hops, e.g., to a range of 0 to −30° F. In some examples, step 104 includes reducing the temperature of the raw hops to a range of −30 to −50° F. Cooling the hop cones to temperatures substantially below freezing, such as −30 to −50° F., results in better separation of lupulin powder and vegetative matter (AKA bract) at later stages of the cryogenic hop processing method. In some examples, freezing the raw hops causes the hops to become brittle, which facilitates fracturing of the hops using the same apparatus being used to mix and/or convey the hops (e.g., simultaneously). In some examples, cooling and/or freezing the hop cones includes cooling the hop cones to a temperature below a glass transition temperature of vegetative matter contained within the hop cones. Accordingly, the cooled hop cones may shatter upon contact with an agitator of the mixing apparatus.

Step 106 of method 100 includes fracturing the loose hops into two or more smaller pieces. Fracturing the loose hops into pieces may include any suitable method configured to fracture or break the hops into pieces while preserving the general structure of the bracts and bracteoles. Fracturing, as used herein, may be contrasted with grinding, pulverizing, milling, and/or the like. Fracturing reduces the size of the hop pieces, while preserving the overall structure of the vegetative matter. In contrast, grinding, pulverizing, milling, and/or the like changes a shape and/or structure of the loose hops. The lupulin powder and vegetative matter are separated by sifting at a later step, and should therefore remain distinct in size and shape until separation. The fractured vegetative matter may have any suitable shape or size, but should generally be larger than holes in the screens utilized in the later separating step. Accordingly, fracturing the loose hops does not include milling the hops into pieces which may be indistinguishable from lupulin powder. Generally, fracturing the loose hops includes shattering the hops into pieces having an average particle size of 12 mm-18 mm, while milling the loose hops includes grinding the loose hops into pieces having an average particle size of 2 mm-6 mm. Accordingly, fractured hop pieces according to the present method may be more effectively separated into lupulin powder and vegetative matter than milled, ground, and/or pulverized hop pieces. Lupulin prepared according to the present method is less prone to hop creep than pulverized and/or ground hops. In some examples, the loose hops may be processed into smaller pieces by milling and/or chopping the loose hops utilizing a cutting mill, such as a knife mill and/or the like.

In some examples, step 104 and step 106 are performed simultaneously or substantially simultaneously, such that the loose raw hops are simultaneously cooled and fractured using a cryogenic mixer. In these cases, an additional milling step is unnecessary to properly reduce the size of the hops. In other words, it is not necessary to use a mill (knife mill, cone mill, or the like) in method 100. An entirety of the size reduction steps are carried out at step 106, i.e., while the hops are chilled. Instead of milling, a cryogenic mixer/conveyor mixes the raw hops while injecting liquid nitrogen into the mixer volume (e.g., the same general space as the hops). In some examples, liquid nitrogen is injected into the mixer, cooling the loose raw hops to a specified temperature, before the hops are agitated and fractured by the mixer. In some examples, liquid nitrogen is injected into the mixer while the hops are agitated by the mixer, causing the hops to be cooled and fractured substantially simultaneously. As the hops are cooled by the liquid nitrogen, the hops become brittle and susceptible to fracturing upon contact with agitators (e.g., paddles) of the same cryogenic mixer. In some examples, fracturing the hops into fractured hop pieces produces vegetative matter having an average particle size of 12 mm-18 mm.

The cryogenic mixer may include any suitable agitators configured to stir or mix the contents of the mixer, such as paddles, augers, and/or the like. In the example described below with respect to hop processing system 200, the cryogenic mixer includes a plurality of paddles radially extending from and arranged around a central shaft. The central shaft is rotated by the cryogenic mixer, such that the paddles mix the hops into a substantially homogeneous mixture. In some examples, the central shaft is oriented substantially horizontally, and the plurality of paddles are flighted in a generally spiral-shaped topology, such that the paddles also convey the hops along the central shaft to move the hops through the cryogenic mixer. This is similar to a horizontal auger conveyance system. However, in contrast with a conventional screw-shaped auger, the paddles form a discontinuous conveyance surface (e.g., there are gaps between and in some examples within the paddles). Accordingly, the frozen hops may experience a greater number of collisions with the paddles than the hops would experience with a similarly oriented continuous auger blade. This increased number of collisions generally causes the frozen hops to fracture into two or more pieces upon contact with the paddles. Accordingly, hops manufactured in accordance with the present method and/or utilizing the present system are fractured by the cryogenic mixer and do not require a subsequent milling step.

Step 108 of method 100 includes separating the fractured hop pieces into lupulin powder and vegetative matter. Vegetative matter, as used herein, refers to any vegetative matter included within the hop plant, such as bracts, bracteoles, strig, bine pieces, and/or the like. Separating the fractured hop pieces into lupulin powder and vegetative matter may include any suitable separation method, such as sifting, vibrating, shaking, vacuum separating, blowing, and/or the like. In some examples, separating the fractured hop pieces into lupulin powder and vegetative matter includes sifting the fractured hop pieces, such that the fractured hop pieces are divided into lupulin powder and vegetative manner. In some examples, sifting the fractured hop pieces includes shaking or vibrating the fractured hop pieces over screens having holes large enough for lupulin powder to pass through and small enough to prevent pieces of vegetative matter from passing through. In some examples, fracturing the hops according to steps 104 and 106 produces vegetative matter having an average particle size from 12 mm-18 mm. Accordingly, an average particle size of the vegetative matter is larger than an average particle size of the lupulin powder. In some examples, the vegetative matter has an average particle size at least one order of magnitude greater than an average particle size of the lupulin powder (i.e., an average particle size of the vegetative matter is at least ten times greater than an average particle size of the lupulin powder). In some examples, sifting the fractured hop pieces includes shaking the fractured hop pieces over screens having holes having any suitable size, such as from 4 mm to 6 mm, from 7 mm to 9 mm, from 1 mm to 3 mm, and/or the like. In some examples, liquid nitrogen is injected into the sifter and onto the screens, such that the step of separating the fractured hop pieces into lupulin powder and vegetative matter is performed at temperatures in a range from −10 to −30° F.

Preventing pieces of vegetative matter from intermixing with the separated (e.g., sifted) lupulin powder facilitates the production of highly concentrated lupulin powder. Vegetative matter may be added back into the lupulin powder at a later processing stage, e.g., to produce a lower-concentration product. However, while the concentration can be selectively lowered, there is no opportunity for the lupulin powder to become more concentrated after this stage (i.e., step 108 of method 100). Accordingly, it is advantageous to produce a highly concentrated lupulin powder at the separating step, e.g., to facilitate a broader level of concentration control later in the process. In some examples, separating the fractured hop pieces includes passing the fractured hop pieces through a vibrating (vibrational, vibratory) sifter machine, such as a Vibro sifter, which separates the fractured hops into two product streams: vegetative matter and lupulin powder. In some examples, the lupulin powder is transported between the vibrating sifter machine and the pellet die (in some cases through further apparatuses such as holding tanks) using a pneumatic conveyance system, i.e., without the use of auger(s). Accordingly, the lupulin powder is minimally processed after being separated from the vegetative matter.

In some examples, optional step 110 of method 100 includes mixing vegetative matter into the lupulin powder to achieve a desired formulation. In some examples, step 110 includes testing a percentage of alpha acids of the lupulin powder. In some examples, a measured percentage of alpha acids of the lupulin powder is equal to a desired percentage of alpha acids, and the formulated lupulin powder is transferred to the pellet mill without further processing. In some examples, testing the percentage of alpha acids of the lupulin powder reveals a higher-than-desired percentage of alpha acids. In this case, a selected amount of vegetative matter may be added to the lupulin powder to dilute the mixture to a desired concentration. In some examples, mixing the vegetative matter into the lupulin powder is an iterative process, involving repeated testing of the alpha acid percentage, adding vegetative matter to the lupulin powder, and mixing the vegetative matter with the lupulin powder. Any suitable testing method may be utilized to determine the alpha acid level and/or other characteristics of the lupulin mixture. In some examples, the lupulin powder is tested using wet lab chemical testing. In some examples, the lupulin powder is tested using rapid and/or in situ testing. In some examples, the percentage of alpha acids of the lupulin powder is compared to a percentage of alpha acids of the loose raw hops, which is measured before processing.

In some examples, lupulin powder isolated according to the present method has an alpha acid concentration value 2.5× (i.e., 2.5 times) to 3× (i.e., 3 times) higher than an initial concentration with respect to the loose raw hops. Accordingly, in some examples, vegetative matter is added to the lupulin powder until an alpha acid concentration value of the formulated lupulin is from 1.7× to 2.1× (i.e., 1.7 to 2.1 times) an initial concentration with respect to the loose raw hops. However, other concentrations may be desired based on the application. In some examples, liquid nitrogen may be injected into the mixing vessel, such that the lupulin powder is chilled, e.g., to a temperature of 0 to 30° F.

In some examples, optional step 112 of method 100 includes compressing the formulated lupulin powder into pellets. Compressing the formulated lupulin powder includes using a die having a plurality of apertures configured to produce pellets, such as a die included in a typical pellet mill. In some examples, compressing the lupulin powder into pellets includes chilling the lupulin powder before (e.g., immediately before) adding the lupulin powder to the pellet mill. In some examples, a lupulin intake line or supply pipe for the pellet mill has a liquid nitrogen injection system configured to chill the lupulin powder, e.g., to a temperature of 40 to 50° F. In some examples, the intake line for the pellet mill comprises a cryogenic auger, including a liquid nitrogen injection system and an agitation device, such as paddles, a corkscrew, forks, knives, and/or the like. In some examples, the formulated lupulin powder is transported between the mixing vessel and the die using a pneumatic conveyance system, i.e., without the use of an auger. In some examples, the pellet mill includes a flat die including a plurality of cylindrical apertures or slots. In these examples, the lupulin powder is introduced to the top of the die and pressed through the holes in the die using a roller, screw press, hydraulic press, and/or any suitable platen. In some examples, the pellet mill includes a ring (AKA annular) die comprising radial slots or apertures. In this example, lupulin powder is introduced to the center of the ring die and distributed using one or more spreaders and/or centrifugal force introduced by spinning of the machine. Rollers compress the lupulin powder through the cylindrical die holes. The pellet mill further includes cutters adjacent to an external surface of the die, which cut the pellets into a desired length. In some examples, the compressed pellets are subsequently conveyed to a pellet cooler.

In some examples, optional step 114 of method 100 includes shaking and/or sifting the lupulin pellets and recycling fines back into the system (e.g., into the mixing vessel). Fines may include any uncompressed matter passed through the pellet mill, such as pellet dust, uncompressed lupulin powder, and/or the like. In some examples, shaking the lupulin pellets includes placing the lupulin pellets into a shaker screen and shaking the screen to dislodge any fines. In some examples, shaking the lupulin pellets includes utilizing a vibrating sifting machine, such as a Vibro sifter, to dislodge any fine waste. Any fines may be conveyed from the shaker to the mixing vessel and recycled.

In some examples, step 116 of method 100 optionally includes packaging and/or storing the lupulin pellets. In some examples, the lupulin pellets are weighed and packaged by hand. In some examples, the lupulin pellets are weighed and packaged using an automated packaging system. In some examples, the packaged lupulin pellets are packaged in a chilled work area. In some examples, the packaged lupulin pellets are packaged and subsequently transferred to cold storage.

In some examples, any and/or all of steps 102 to 116 include conveying hops and/or hop byproducts (i.e., lupulin powder, vegetative matter) using a negative air pressure pneumatic conveyance system. Accordingly, the hops and/or hop byproducts in these examples are conveyed without the use of an auger, and do not experience further collisions and/or fracturing steps during conveyance. In some examples, the lupulin powder may be conveyed throughout the system in an enclosed manner.

Nitrogen may be injected into the conveyance system to displace unwanted oxygen. In some examples, a portion of the nitrogen from the cryogenic mixer remains in the enclosed conveyance system and at least partially fulfills this function.

B. Illustrative Hop Processing System

Figure 2:
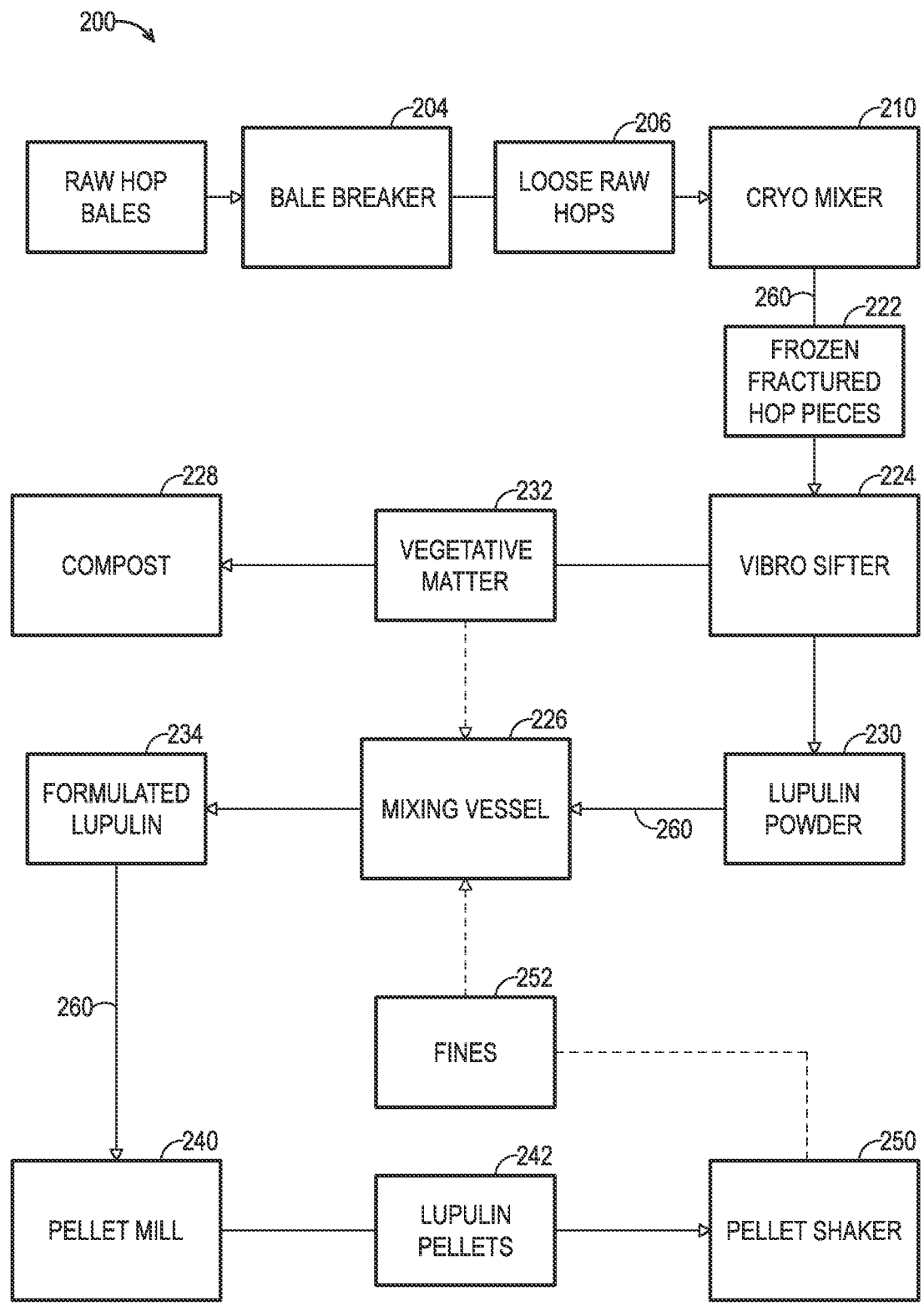
FIG. 2 is a schematic diagram depicting an illustrative hop processing system in accordance with aspects of the present disclosure.
Figure 3:
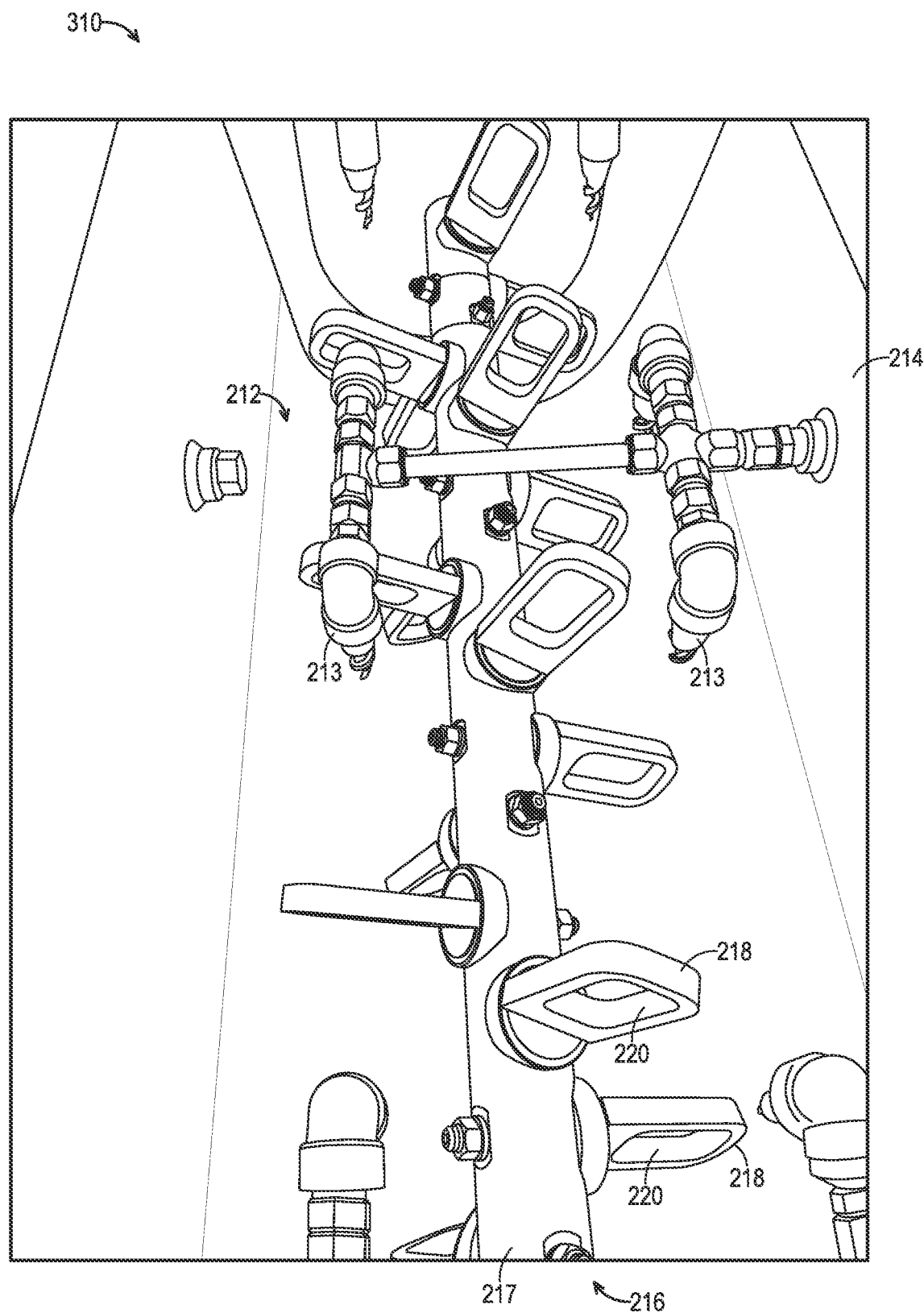
FIG. 3 is a partial oblique view of an illustrative cryogenic mixer suitable for use in the hop processing system of FIG. 2, with an upper portion of the normally enclosed mixer removed to reveal internal components.

As shown in FIGS. 2-3, this section describes an illustrative hop processing system 200. Hop processing system 200 includes a plurality of machines and devices collectively configured to produce lupulin powder and/or lupulin pellets from raw hops, e.g., implementing method 100.

Hop processing system 200 optionally includes a bale breaker 204. Bale breaker 204 comprises one or more agitators, such as rollers, augers, combs, blades, knives, screws, paddles, and/or the like, which aerate and agitate raw hop bales, breaking the hop bales into loose raw hops 206. Loose raw hops 206 are then conveyed to a cryogenic mixer 210 using any suitable conveyance system or combination of devices, such as vacuum tubes, conveyor belts, augers, and/or the like. In some examples, loose raw hops 206 are conveyed to cryogenic mixer 210 by way of a vacuum tube leading to a horizontal auger.

Cryogenic mixer 210 is configured to cool and fracture the loose raw hops. Accordingly, cryogenic mixer 210 includes at least a liquid nitrogen injection system configured to inject liquid nitrogen into a mixing chamber containing the hops and an agitator configured to fracture the hops into one or more pieces. The cryogenic mixer may include any suitable agitators configured to stir or mix the contents of the mixer, such as paddles, augers, and/or the like. In some examples, the cryogenic mixer comprises an agitator comprising a plurality of paddles coupled to a central shaft.

As depicted in FIG. 3, cryogenic mixer 310 is an example of cryogenic mixers 210 suitable for use in illustrative hop processing system 200. Accordingly, cryogenic mixer 310 includes a liquid nitrogen injection system 212, a trough 214, and a horizontally oriented agitator 216 collectively configured to simultaneously chill and fracture the hops into one or more pieces. Liquid nitrogen injection system 212 comprises a plurality of nozzles 213 disposed above agitator 216, which inject liquid nitrogen into the trough. As the hops are cooled by the liquid nitrogen, the hops become brittle and susceptible to fracturing upon contact with agitator 216. Liquid nitrogen injection system 212 may inject liquid nitrogen to achieve a specified hop temperature. In some examples, the liquid nitrogen injection system is configured to cool the hops to −10 to −30° F. In some examples, the liquid nitrogen injection system is configured to cool the hops to −30 to −50° F., as cooler temperatures lead to higher yields when lupulin powder is separated from vegetative matter (i.e., at step 108 of method 100 and/or by vibrating sifter machine 224). Agitator 216 includes paddles 218 distributed radially around a central shaft 217. As the shaft is rotated, the hops are repeatedly struck by the paddles, fracturing the hops into one or more pieces. In some examples, paddles 218 are flighted in a spiral pattern, and are configured to convey the hops through the trough along the central shaft. In some examples, paddles 218 have holes or apertures 220. For example, each paddle may include a central aperture, such that the paddle is substantially ring-shaped. Holes or apertures 220 may facilitate increased fluid flow through the aperture, facilitating increased contact between the hops and the liquid nitrogen. Apertures 220 may have any suitable size or shape, such as oval, rectangular, round, oblong, and/or the like. In some examples, paddles 218 are substantially continuous in structure, and do not include any holes or discontinuities. In some examples, the fractured hop pieces are conveyed to vibrating sifter machine 224 by way of a vacuum tube.

System 200 next includes a vibrating sifter machine 224. Vibrating sifter machine 224 is configured to separate fractured hop pieces 222 into two separate product streams: lupulin powder 230 and vegetative matter 232. Vibrating sifter machine 224 includes a sifter screen having holes which are smaller than the fractured hop pieces, but large enough to allow lupulin powder to pass through. In some examples, fracturing the hops according to steps 104 and 106 of method 100, or using cryogenic mixer 210, produces vegetative matter having an average particle size from 12 mm-18 mm. Accordingly, a particle size of the vegetative matter is larger than a particle size of the lupulin powder. The sifter screen may comprise holes having any suitable size, such as from 4 mm to 6 mm, from 7 mm to 9 mm, from 1 mm to 3 mm, and/or the like. In some examples, the fractured hop pieces have an average particle size at least one order of magnitude greater than an average particle size of the lupulin powder (i.e., an average particle size of the fractured hop pieces is at least ten times greater than an average particle size of the lupulin powder). Vibrating sifter machine 224 shakes the fractured hop pieces, causing lupulin powder to fall through the screen to a receptacle disposed beneath the screen. The lupulin powder is subsequently conveyed to mixing vessel 226, e.g., using a negative air pressure pneumatic conveyance system. The vegetative matter is retained by the sifter screen, and is conveyed to compost 228 and/or to a collection system for later use in formulation. In some examples, vibrating sifter machine 224 comprises a Vibro sifter. In some examples, vibrating sifter machine 224 comprises a vibrating rotary drum sifter. In some examples, vibrating sifter machine 224 further comprises a liquid nitrogen injection system configured to cool the fractured hop pieces to any suitable temperatures, such as from −10 to −30° F., e.g., by injecting liquid nitrogen into the sifter and onto the sifter screen.

System 200 next includes a mixing vessel 226 configured to mix the lupulin powder with vegetative matter to produce formulated lupulin powder having a desired formulation (e.g., concentration, alpha acid content, etc.). The mixing vessel comprises a tank and an agitator configured to mix the lupulin powder within the tank. In some examples, concentration testing is performed on the lupulin powder to determine a percentage of alpha acids of the lupulin powder. The concentration testing may be performed using any suitable method, such as wet lab chemical testing, in situ testing, rapid testing, and/or the like. The mixing vessel may be coupled to a backflow system configured to selectively reintroduce vegetative matter to the lupulin powder to achieve a desired concentration. Cryogenic mixer 210 and vibrating sifter 224 are collectively configured to produce highly concentrated lupulin powder. Accordingly, in some examples, vegetative matter is reintroduced to mixing vessel 226 (e.g., at step 110 of method 100) to dilute the lupulin powder to a desired concentration. In some examples, the raw hops are tested prior to processing to determine an initial concentration of the hops, and the lupulin powder is diluted until the formulated lupulin has a concentration 1.7×-2.1× the initial concentration of the hops.

Mixing vessel 226 may further comprise a bucket elevator or other conveyance mechanism coupled to (e.g., a side of) the mixing vessel. The bucket elevator may be coupled by way of a valve to the vegetative matter product stream, such that the vegetative matter can be selectively redirected from the vibrating sifter to the compost and/or elevator. Opening the valve may initiate vegetative matter transfer to the bucket elevator by way of a vacuum tube and airlock. In some examples, vegetative matter is added to the mixing vessel in stages and the concentration of the lupulin powder is tested after each addition of vegetative matter. In some examples, the mixing vessel includes one or more scales, such as one or more load cells, which may measure respective weights of the lupulin powder mixture in the mixing vessel and vegetative matter in the backflow system. Accordingly, a desired amount of vegetative matter may be calculated and added to the mixing vessel based on the respective weights, resulting in a single addition of vegetative matter to the mixing vessel.

In some examples, mixing vessel 226 further comprises a liquid nitrogen injection system configured to cool the formulated lupulin powder to any suitable temperature, such as from 0 to 30° F.

After the lupulin powder has been mixed with vegetative matter to produce formulated lupulin powder 234, the formulated lupulin powder is transferred to a pellet mill 240. The pellet mill is configured to compress the formulated lupulin powder into pellets 242. Formulated lupulin powder 234 is transferred into the pellet mill by way of a chilled intake line, which is configured to cool the lupulin powder before entering the mill to be compressed into pellets. In this example, the chilled intake line comprises a plurality of liquid nitrogen injection nozzles, which inject liquid nitrogen into the formulated lupulin product stream. In some examples, the chilled intake line further comprises an agitator, such as an auger, screw, and/or the like, which further mixes the liquid nitrogen with the formulated lupulin. The chilled intake line may be configured to chill the formulated lupulin powder to any suitable temperature, such as from 40 to 50° F. The chilled lupulin then enters the pellet mill and is compressed into pellets by the pellet mill. The pellet mill of the present example comprises an annular ring die including a plurality of radial apertures, however any suitable pellet mill, such as a flat die mill, may be utilized. The ring die includes a central chamber into which the formulated lupulin powder is introduced. Spreaders distribute the formulated lupulin powder throughout the ring die, while rollers compress the formulated lupulin powder through the apertures. The apertures may be substantially cylindrical in shape, or may have any suitable cross-section such as circular, square, oval, rectangular, and/or the like. The pellet mill further includes cutters adjacent to an external surface of the die, which cut the pellets into a desired length. In some examples, the compressed pellets are subsequently conveyed to a pellet cooler.

System 200 next includes a pellet shaker 250, which is configured to shake the compressed lupulin pellets 242 to dislodge any fines 252. Pellet shaker 250 comprises a shaker screen and a shaker, which dislodge any fines which were not adequately compressed by the pellet mill. In some examples, the pellet shaker comprises a vibrating sifting machine, such as a Vibro sifter. Fines 252 are conveyed from the shaker to mixing vessel 226 by any suitable system, such as a vacuum tube, screw drive, conveyor belt, and/or the like, where the fines are mixed with lupulin powder and bract. In some examples, the shaken pellets are packaged by an automated packaging system for weighing and bagging, boxing, etc. The boxed pellets may be labeled, stacked, and subsequently transferred to finished good cold storage.

Hop processing system 200 includes a conveyance system 260 configured to transport hops and hop byproducts (e.g., lupulin powder, vegetative matter, fines, etc.) between components of hop processing system 200. Specific examples of suitable conveyance systems are discussed above with respect to individual components of system 200, but in general hops and hop byproducts may be conveyed in any suitable manner, such as with augers, conveyers, vacuum tubes, and/or the like. In some examples, lupulin may be conveyed throughout the system in an enclosed system (e.g., in an environment devoid of oxygen.) Nitrogen may be injected into conveyance system 260 to displace unwanted oxygen. In some examples, a portion of the nitrogen from the cryogenic mixer remains in the enclosed conveyance system and at least partially fulfills this function. In some examples, a negative air pressure pneumatic conveyance system may be utilized for some and/or all of the lupulin conveyance. When used herein, the term vacuum tube refers to such a pneumatic system.

C. Illustrative Combinations and Additional Examples

This section describes additional aspects and features of cryogenic hop processing methods and systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for cryogenically processing hops, the method comprising:
  simultaneously cryogenically cooling a plurality of hop cones and fracturing each hop cone of the plurality of hop cones into respective fractured hop pieces using a cryogenic mixer;
  without an intervening fracturing step, separating the fractured hop pieces such that the fractured hop pieces are divided into lupulin powder and vegetative matter; and compressing the lupulin powder into pellets.

A1. The method of paragraph A0, wherein simultaneously cooling the hops and fracturing the hops comprises injecting liquid nitrogen into the cryogenic mixer.

A2. The method of paragraph A0 or A1, wherein the hop cones are fractured, separated, and compressed into pellets without milling.

A3. The method of any of paragraphs A0 through A2, wherein a size of the fractured hop pieces is substantially consistent between the fracturing step and the separating step.

A4. The method of any of paragraphs A0 through A3, wherein the fractured hop pieces have an average particle size of 12 mm to 18 mm.

A5. The method of any of paragraphs A0 through A4, wherein cooling the hops comprises cooling the hops to −30 to −50° F.

A6. The method of any of paragraphs A0 through A5, further comprising:
  mixing a selected amount of vegetative matter into the lupulin powder to produce formulated lupulin powder; and
  wherein compressing the lupulin powder into pellets comprises compressing the formulated lupulin powder.

A7. The method of paragraph A6, wherein mixing a selected amount of vegetative matter into the lupulin powder to produce formulated lupulin powder further comprises:
  measuring a percentage of alpha acids of the lupulin powder; and
  adding vegetative matter to the lupulin powder until the lupulin powder has a desired percentage of alpha acids.

A8. The method of paragraph A6, wherein mixing a selected amount of vegetative matter into the lupulin powder to produce formulated lupulin powder further comprises:
  measuring a percentage of alpha acids of the lupulin powder;
  calculating a concentration of the lupulin powder by comparing the measured percentage of alpha acids of the lupulin powder to a measured percentage of alpha acids of unprocessed hops; and
  adding vegetative matter to the lupulin powder until the lupulin powder reaches a desired concentration value.

A9. The method of paragraph A8, wherein the desired concentration value is from 1.7× to 2.1× the measured percentage of alpha acids of the unprocessed hops.

A10. The method of any of paragraphs A0 through A9, wherein the step of simultaneously cooling the hops and fracturing the hops into one or more pieces is performed without the use of a mill.

A11. The method of any of paragraphs A0 through A10, wherein compressing the formulated lupulin powder into pellets comprises cooling the formulated lupulin powder by injecting liquid nitrogen into the formulated lupulin powder.

A12. The method of paragraph A11, wherein the formulated lupulin powder is cooled to 0 to 30° F.

A13. The method of any of paragraphs A0 through A12, further comprising shaking the pellets and recycling dislodged fines by mixing the dislodged fines with the lupulin powder in a mixing vessel.

A15. The method of any of paragraphs A0 through A13, wherein the fractured hop pieces have an average particle size at least one order of magnitude greater than an average particle size of the lupulin powder.

A16. The method of any of paragraphs A0 through A13, further comprising conveying the fractured hop pieces from the mixer to a sifter using a negative air pressure pneumatic conveyance system.

B0. A method for cryogenically processing hops, the method comprising:
  simultaneously cryogenically cooling a plurality of hop cones and fracturing each hop cone of the plurality of hop cones into a plurality of respective fractured hop pieces using a cryogenic mixer; and
  separating the fractured hop pieces such that the fractured hop pieces are divided into lupulin powder and vegetative matter;
  wherein an entirety of a size reduction of the plurality of hop cones is carried out in the cryogenic mixer.

B1. The method of paragraph B0, wherein simultaneously cooling the hops and fracturing the hops into a plurality of pieces includes injecting liquid nitrogen into the cryogenic mixer.

B2. The method of paragraph B0 or B1, wherein cooling the hops comprises cooling the hops to −30 to −50° F.

B3. The method of any of paragraphs B0 through B2, further comprising:
  mixing a selected amount of vegetative matter into the lupulin powder to produce formulated lupulin powder; and
  wherein compressing the lupulin powder into pellets comprises compressing the formulated lupulin powder.

B4. The method of paragraph B3, wherein compressing the formulated lupulin powder into pellets comprises cooling the formulated lupulin powder by injecting liquid nitrogen into the formulated lupulin powder.

B5. The method of paragraph B4, wherein cooling the formulated lupulin powder comprises cooling the formulated lupulin powder to 0 to 30° F.

B6. The method of paragraph B3, wherein mixing a selected amount of vegetative matter into the lupulin powder to produce formulated lupulin powder further comprises:
  measuring a percentage of alpha acids of the lupulin powder; and
  adding vegetative matter to the lupulin powder until the lupulin powder has a desired percentage of alpha acids.

B7. The method of paragraph B3, wherein mixing a selected amount of vegetative matter into the lupulin powder to produce formulated lupulin powder further comprises:
  measuring a percentage of alpha acids of the lupulin powder;
  calculating a concentration of the lupulin powder by comparing the measured percentage of alpha acids of the lupulin powder to a measured percentage of alpha acids of unprocessed hops; and
  adding vegetative matter to the lupulin powder until the lupulin powder reaches a desired concentration value.

B8. The method of paragraph B7, wherein the desired concentration value is from 1.7× to 2.1× the measured percentage of alpha acids of the unprocessed hops.

B9. The method of any of paragraphs B0 through B8, wherein a size of the fractured hop pieces is substantially consistent between the fracturing step and the separating step.

B10. The method of any of paragraphs B0 through B9, wherein the fractured hop pieces have an average particle size of 12 mm to 18 mm.

B11. The method of any of paragraphs B0 through B10, wherein the step of simultaneously cooling the hops and fracturing the hops into one or more pieces is performed without the use of a mill.

B12. The method of any of paragraphs B0 through B11, further comprising shaking the pellets and recycling dislodged fines by mixing the dislodged fines with the lupulin powder in a mixing vessel.

B13. The method of any of paragraphs B0 through B12, wherein the fractured hop pieces have an average particle size at least one order of magnitude greater than an average particle size of the lupulin powder.

B14. The method of any of paragraphs B0 through B13, further comprising conveying the fractured hop pieces from the mixer to a sifter using a negative air pressure pneumatic conveyance system.

C0. A system for cryogenically processing hops comprising:
  a cryogenic mixer including:
    one or more liquid nitrogen injection nozzles configured to inject liquid nitrogen into the mixer; and
    an agitator comprising a plurality of paddles coupled to a central shaft;
    wherein the cryogenic mixer is configured to both freeze the hops and fracture the hops into a plurality of pieces; and
  a sifter configured to separate the fractured hops into lupulin powder and vegetative matter.

C1. The system of paragraph C0, further comprising a mixing vessel configured to mix the lupulin powder with a selected amount of vegetative matter to achieve a desired concentration.

C2. The system of paragraph C0 or C1, further comprising a pellet mill configured to compress the lupulin powder into pellets.

C3. The system of paragraph C2, wherein the pellet mill comprises a ring mill.

C4. The system of paragraph C2, wherein the pellet mill comprises a chilled intake line configured to cool the lupulin powder by injecting liquid nitrogen into the intake line.

C5. The system of paragraph C4, wherein the pellet mill is configured to cool the lupulin powder to 40 to 50° F.

C6. The system of any of paragraphs C0 through C5, wherein the cryogenic mixer is configured to cool the hops to −30 to −50° F.

C7. The system of any of paragraphs C0 through C6, wherein the paddles are flighted, such that the agitator is configured to convey the hops along the central shaft.

C8. The system of any of paragraphs C0 through C7, wherein the sifter comprises a Vibro sifter.

C9. The system of any of paragraphs C0 through C8, further comprising a bale breaker configured to break bales of hops into loose hops.

C10. The system of any of paragraphs C0 through C9, wherein each paddle includes a central aperture, such that each paddle is substantially ring-shaped.

C11. The system of any of paragraphs C0 through C10, further comprising a negative air pressure pneumatic conveyance system configured to convey the hops between the cryogenic mixer and the sifter.

Advantages, Features, and Benefits

The different embodiments and examples of the cryogenic hop processing method described herein provide several advantages over known solutions for producing pelletized lupulin. For example, illustrative embodiments and examples described herein allow hops to be cooled and fractured in a single step and/or using a single apparatus. This eliminates the need for further fracturing, e.g., using a mill (e.g., a cone mill or knife mill), thereby greatly reducing manufacturing complexity, cost, and maintenance. In some examples, conveyance is also accomplished during the cooling and fracturing, e.g., using the same apparatus.

Additionally, and among other benefits, illustrative embodiments and examples described herein release lupulin from hop cones without pulverizing the vegetative matter (AKA bract) of the hop cones, thereby increasing alpha acid concentration of the lupulin powder when compared with lupulin isolated or extracted by other hop processing methods.

Additionally, and among other benefits, illustrative embodiments and examples described herein allow lupulin powder to be easily formulated to achieve specific concentrations and percentages of alpha acids.

Additionally, and among other benefits, illustrative embodiments and examples described herein recycle waste generated in a variety of processing steps.

Additionally, and among other benefits, illustrative embodiments and examples described herein convey the lupulin using an auger-free conveyance system. For example, a negative-pressure pneumatic tubing or ducting system may be utilized for this purpose. This results in more gentle handling of the product.

Additionally, and among other benefits, illustrative embodiments and examples described herein do not pulverize the hops, resulting in minimal damage to the hops.

Additionally, and among other benefits, illustrative embodiments and examples described herein are highly efficient, as chilling the hops prevents lupulin powder from adhering to the vegetative matter, reducing loss of residual lupulin powder during sifting.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A method for cryogenically processing hops, the method comprising:
   simultaneously cryogenically cooling a plurality of hop cones and fracturing each hop cone of the plurality of hop cones into respective fractured hop pieces using a cryogenic mixer, wherein fracturing each hop cone of the plurality of hop cones comprises reducing a particle size of vegetative matter within each hop cone; without an intervening fracturing step, separating the fractured hop pieces such that the fractured hop pieces are divided into lupulin powder and the vegetative matter; and
   compressing the lupulin powder into pellets.

2. The method of claim 1, wherein simultaneously cooling the hops and fracturing the hops into pieces comprises injecting liquid nitrogen into the cryogenic mixer.

3. The method of claim 1, wherein a size of each of the fractured hop pieces is substantially consistent between the fracturing step and the separating step.

4. The method of claim 1, wherein cooling the hops comprises cooling the hops to −30 to −50° F.

5. The method of claim 1, further comprising:
   mixing a selected amount of vegetative matter into the lupulin powder to produce formulated lupulin powder;
   wherein compressing the lupulin powder into pellets comprises compressing the formulated lupulin powder.

6. The method of claim 5, wherein mixing a selected amount of vegetative matter into the lupulin powder to produce formulated lupulin powder further comprises:
   measuring a percentage of alpha acids of the lupulin powder; and
   adding vegetative matter to the lupulin powder until the lupulin powder has a desired percentage of alpha acids.

7. The method of claim 5, wherein mixing a selected amount of vegetative matter into the lupulin powder to produce formulated lupulin powder further comprises:
   measuring a percentage of alpha acids of the lupulin powder;
   calculating a concentration of the lupulin powder by comparing the measured percentage of alpha acids of the lupulin powder to a measured percentage of alpha acids of unprocessed hops; and
   adding vegetative matter to the lupulin powder until the lupulin powder reaches a desired concentration value.

8. The method of claim 5, wherein compressing the formulated lupulin powder into pellets comprises cooling the formulated lupulin powder by injecting liquid nitrogen into the formulated lupulin powder.

9. The method of claim 1, wherein the fractured hop pieces have an average particle size of 12 mm to 18 mm.

10. A method for cryogenically processing hops, the method comprising:
    simultaneously cryogenically cooling a plurality of hop cones and fracturing each hop cone of the plurality of hop cones into a plurality of respective fractured hop pieces using a cryogenic mixer, wherein fracturing each hop cone of the plurality of hop cones comprises reducing a particle size of vegetative matter within each hop cone; and
    separating the fractured hop pieces such that the fractured hop pieces are divided into lupulin powder and vegetative matter;
    wherein an entirety of a size reduction of the vegetative matter is carried out in the cryogenic mixer.

11. The method of claim 10, wherein simultaneously cooling the hops and fracturing the hops into pieces includes injecting liquid nitrogen into the cryogenic mixer.

12. The method of claim 10, wherein cooling the hops comprises cooling the hops to −30 to −50° F.

13. The method of claim 10, further comprising:
    mixing a selected amount of vegetative matter into the lupulin powder to produce formulated lupulin powder;
    wherein compressing the lupulin powder into pellets comprises compressing the formulated lupulin powder.

14. The method of claim 13, wherein compressing the formulated lupulin powder into pellets comprises cooling the formulated lupulin powder by injecting liquid nitrogen into the formulated lupulin powder.

15. The method of claim 14, wherein cooling the formulated lupulin powder comprises cooling the formulated lupulin powder to 0 to 30° F.

\* \* \* \* \*